Figure 1:
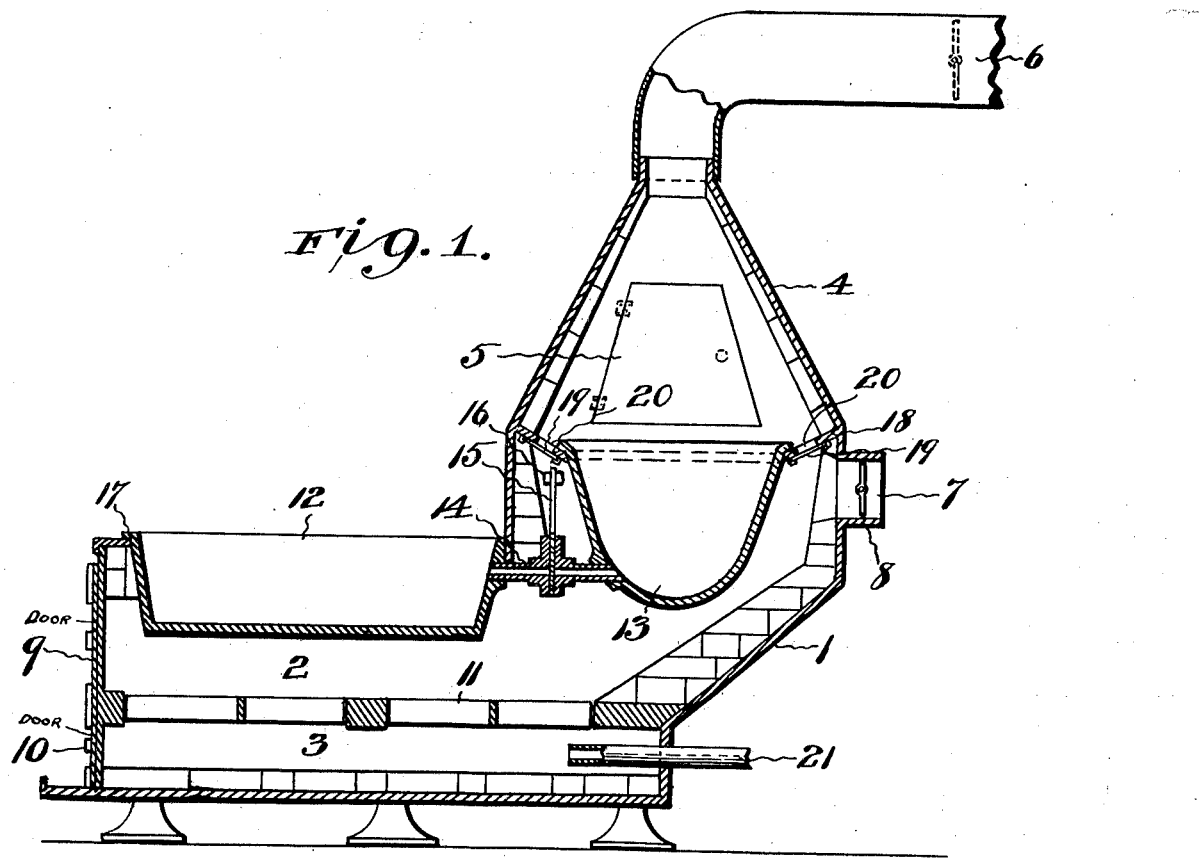

G. E. DUNTON.
FURNACE FOR USE IN THE ART OF ELECTROTYPING.
APPLICATION FILED AUG. 3, 1914.

1,112,993.

Patented Oct. 6, 1914.

Witnesses
W. C. Blackwood
Jos. C. Casson

Inventor
George E. Dunton
by Blackwood Bros,
Attorneys

UNITED STATES PATENT OFFICE.

GEORGE E. DUNTON, OF NEW YORK, N. Y.

FURNACE FOR USE IN THE ART OF ELECTROTYPING.

1,112,993.  Specification of Letters Patent.  Patented Oct. 6, 1914.

Application filed August 3, 1914. Serial No. 854,750.

*To all whom it may concern:*

Be it known that I, GEORGE E. DUNTON, residing at New York, in the county of New York and State of New York, a citizen of the United States, have invented a certain new and useful Improvement in Furnaces for Use in the Art of Electrotyping; and I do hereby declare the following to be a full, clear, and exact description of the invention, such as will enable others skilled in the art to which it appertains to make and use the same.

My invention relates to an improvement in furnaces particularly for use in the art of electrotyping, but which may be used equally as well in the stereotype, linotype or other similar trade industries.

The invention has for its object to provide means whereby the usual melting pot, used in the electrotyping art, is supplied with molten metal in such a manner that the molten metal can be maintained at the same level at all times.

The invention further has for its object to provide a furnace with a plurality of melting pots or receptacles adapted to contain molten metal, the molten metal of one of the melting pots or receptacles adapted to be transferred to the other melting pot or receptacle for the purpose of replenishing it when the molten metal therein falls below the desired level.

The invention further has for its object to provide a furnace with a plurality of melting pots or receptacles adapted to contain molten metal, and means for covering one of the melting pots or receptacles and carrying away the gases or other products of combustion.

To the best of my knowledge all furnaces used, in the art of electrotyping, at the present time, are provided with but one melting pot or receptacle in which the metal is both melted and served.

My invention is especially adapted and valuable in the electrotype, stereotype and linotype arts or industries wherein it is desirable to furnish the melting pot or receptacle with a constant supply of molten metal in order to maintain the molten metal at the same level and to have the supply of molten metal clean and free from drosses and other foreign substances.

Under the present prevailing conditions, where only one melting pot or receptacle is used, it is impossible to accomplish the above named results owing to the fact that the continual removal of the molten metal the supply in the one melting pot or receptacle becomes depleted or entirely exhausted, when the work must be stopped, the molten metal replenished by filling the melting pot or receptacle, generally by means of a shovel, allowing the metal to melt, burning out the dross and skimming off the resulting dirt from the surface of the molten metal before work can be resumed. The introduction of such a quantity of metal, at each filling of the melting pot or receptacle, also necessarily cools the metal down to such a degree that further additional time is necessary for the entire mass to become sufficiently heated to resume operations, which means entails a great loss of valuable time and a curtailed product amounting to as high as twenty five per cent. of the total day's output of work produced.

My invention is also particularly useful where it is desired to refine sweepings from the floor in manufacturing plants where shavings, turnings and chips of metal drop to the floor and become mixed with wood, sawdust, oil, dirt or other foreign matters and it becomes necessary to inclose or cover the melting pot or receptacle which in turn is connected to the flue of the furnace to confine and carry away the smoke and gases incident to the melting and refining of the metal shavings, dirt or other foreign matters.

Figure 2:
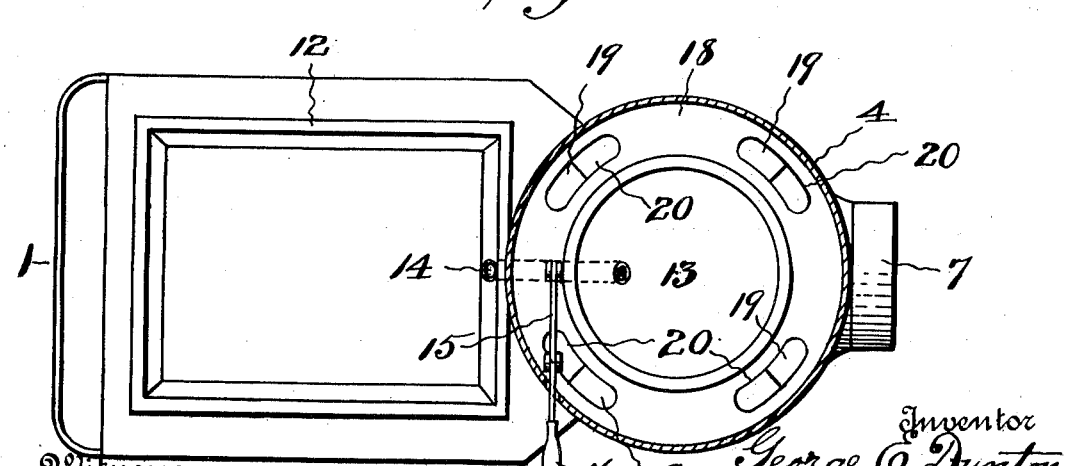

Referring to the drawings:—Figure 1 is a central longitudinal sectional view of the invention. Fig. 2 a top plan view partly in section.

In the drawings, in which similar reference characters denote similar parts throughout the several views, 1 represents the furnace comprising the fire compartment or chamber 2 ash pit 3, dome or cover 4 having a door 5, flue 6 leading from the top of the dome or cover, a flue 7 leading direct from the fire compartment or chamber and provided with a damper 8, fuel supply door 9, clean out door 10 closing the front of the ash pit and grate bars 11.

A plurality of melting pots or receptacles 12 and 13 are provided placed, preferably, one behind the other and provided with a communicating pipe or duct 14 having a valve 15 with an operating lever 16. The melting pot or receptacle 12 is mounted in an opening 17 in the top of the furnace while the melting pot or receptacle 13 is mounted in a ring 18 projecting from the inner wall of the dome 4 and 19 are a series of dampers for regulating the passage of the products of combustion though the series of openings 20 in said ring.

A pipe 21 is provided through which compressed air can be introduced to the furnace for the purpose of accelerating the fire and helping the melting of the metals in both the serving and supply pots or receptacles. This pipe is adapted to be connected to any suitable source of air under pressure.

The series of openings 20 in the rings 18 when opened provide means whereby the heated products of combustion are deflected from the usual course, through the flue 7, and are caused to entirely surround and heat the pot or receptacle 13 below said ring and then pass through said holes and heat the same above the ring, thus heating above and below said ring. By this means the supply pot or receptacle 13 may be used for the so-called "sweating-out" dirt containing metal process as it is entirely and completely surrounded by heat.

In use the desired quantity of new metal, metal sweepings or other scrap metal or foreign matter is placed in each of the melting pots or receptacles 12 and 13, a fire is started in the fire box of the furnace which causes the metal in both of the pots or receptacles to become sufficiently molten for use and as the molten metal in the melting pot or receptacle 12, which I term the serving pot or receptacle, is used up the valve 15 is opened and the molten metal from the melting pot or receptacle 13, which I term the supply pot or receptacle, is allowed to flow into and fill the serving pot or receptacle 12 or until it contains a sufficient amount of molten metal when the valve 15 is closed. During the above operation the door 5 of the dome is kept closed which completely confines and isolates the smoke and fumes from the melting metal scrap and prevents said smoke and fumes from getting into the room where the operation is being performed and impregnating the air to the great discomfort of the workmen and causes said smoke and fumes to be carried away through the flue 6. In the case of the melting pot or receptacle 13 the metal is introduced thereto through the door 5 in the dome. After the supply pot or receptacle 13 has become empty, the valve 15 is closed and the door 5 is opened, the supply pot or receptacle is again filled with metal, metal sweepings or scrap metal and as the metal melts the dirt or other impurities contained therein will rise to the surface of the molten metal, a handful of some flux, such as a mixture of rosin and sal ammoniac or borax is then thrown onto the dirt or other impurities floating on the top of the molten metal and fired, which causes the metal held by the dirt to free itself and mix with the body of the molten metal in the pot or receptacle. After the smoke, incident to the firing, has subsided the door 5 is opened and the dirt skimmed from the surface of the molten metal. By drawing the molten metal from the bottom of the supply pot or receptacle it insures the serving pot or receptacle a supply of the cleanest and clearest molten metal as the impurities have floated to the surface of the metal in the supply pot or receptacle. While using the clean metal from the serving pot or receptacle, or in fact before we begin to use the metal from said pot, the supply pot or receptacle may again be filled with refuse or scrap metal and while using the cleaned metal from the serving pot or receptacle the metal scrap placed in the supply pot can be refined without any attention from the operator, with the exception of the throwing in and firing the flux at the proper time, and when the serving pot or receptacle is again exhausted of metal that which has been refined in the supply pot or receptacle is ready for transferring to the serving pot or receptacle by simply opening the valve in the communicating pipe and allowing the molten metal to run from one to the other. In this manner the operations may be carried on indefinitely without interruption or delay.

The supply pot or receptacle may be of any desired shape and placed in any desired location with relation to the serving pot or receptacle.

Although I have only shown and described two melting pots or receptacles the number may be increased if found desirable.

The supply pot or receptacle is placed behind the serving pot or receptacle for the reason that it may be used without the consumption of additional fuel as it is in the path of the flame from the burning fuel and gases coming from the fire, which ordinarily, in furnaces of this character, pass into the flue before perfect combustion takes place, consequently considerable heat energy is wasted in the flue.

By placing the supply pot or receptacle directly in the path of the flame and gas, the shape of the pot or receptacle being round, the heat strikes the front side and is deflected around all sides of the pot or receptacle before finally reaching the flue which is considerably above the level of the exit behind the serving pot or receptacle.

I do not desire to be understood as limiting myself to the specific details of construction and arrangement as herein described and illustrated, as it is manifest that variations and modifications may be made in the features of construction and arrangement by the adaptation of the device to various conditions of use without departing from the spirit and scope of my invention and improvements. I therefore, reserve the right to all such variations and modifications as properly fall within the scope of my invention and the terms of the following claims.

What I claim is:—

1. A furnace, for use in the art of electrotyping, having a dome, a ring projecting from said dome having a series of apertures, means controlling the passage of the products of combustion through said apertures, a melting pot mounted in said ring, a melting pot communicating with said first mentioned melting pot and means for heating said melting pots, substantially as described.

2. A furnace, for use in the art of electrotyping, having an open melting pot, a closed melting pot, a laterally extending ring in which said closed melting pot is mounted, apertures in said ring, means controlling the passage of the products of combustion through said apertures and means forming a communication between said melting pots, substantially as described.

3. A furnace, for use in the art of electrotyping, having a melting pot, a closed melting pot, means in which the closed melting pot is mounted having apertures, means controlling the passage of the products of combustion through said apertures and means forming a communication between said melting pots, substantially as described.

4. A furnace, for use in the art of electrotyping, having a plurality of melting pots, means forming a communication between said melting pots, one of said melting pots being closed by a cone-shaped dome, a ring projecting from said dome provided with apertures and slidable dampers controlling the passage of the products of combustion through said apertures, substantially as described.

5. A furnace, for use in the art of electrotyping, having a melting pot, a second melting pot, means in which said second melting pot is mounted having apertures, means controlling the passage of the products of combustion through said apertures and means forming a communication between said melting pots, substantially as described.

In testimony whereof, I affix my signature in the presence of two witnesses.

GEORGE E. DUNTON.

Witnesses:
 HENRY W. BECKER,
 NETTIE F. FAIRCHILD.